H. LANE.
APPARATUS FOR HYDROGENIZING OILS AND FATS.
APPLICATION FILED FEB. 12, 1919.
1,307,588.
Patented June 24, 1919.
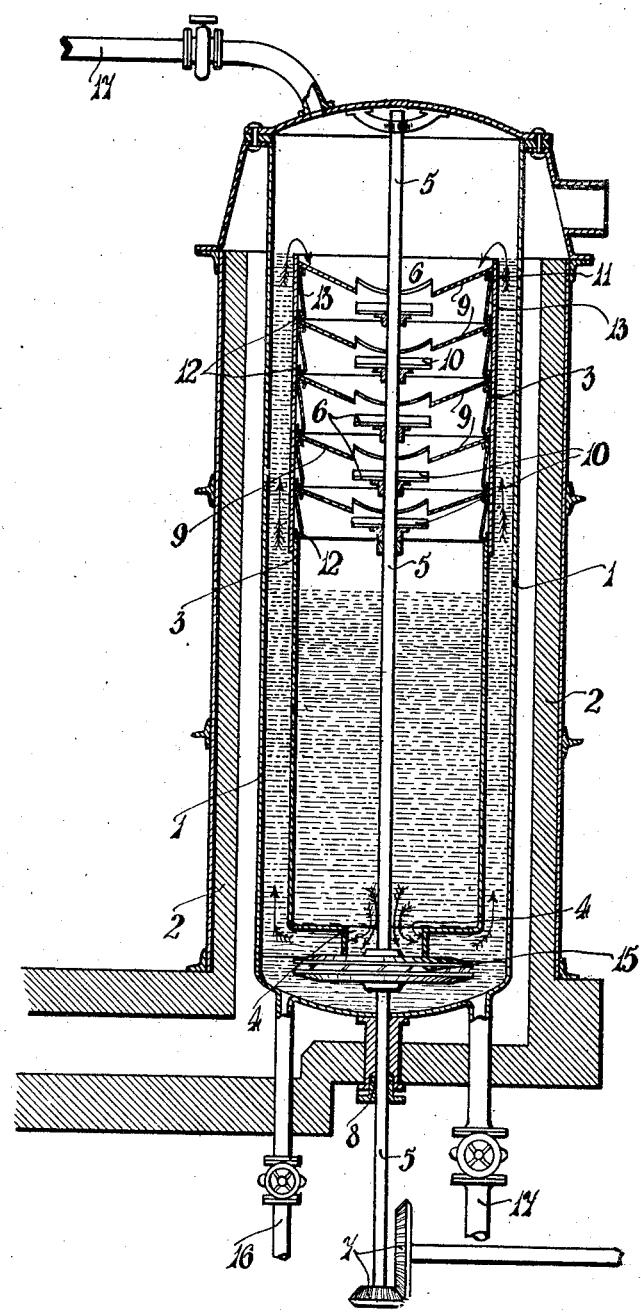
Inventor:-
Howard Lane,
By:- B. Singer, Atty.

UNITED STATES PATENT OFFICE.

HOWARD LANE, OF ASHFORD, ENGLAND.

APPARATUS FOR HYDROGENIZING OILS AND FATS.

1,307,588.  Specification of Letters Patent.  Patented June 24, 1919.

Application filed February 12, 1919. Serial No. 276,571.

*To all whom it may concern:*

Be it known that I, HOWARD LANE, a subject of the King of Great Britain, residing at The Laboratory, Ashford, Middlesex, England, have invented certain new and useful Improvements in Apparatus for Hydrogenizing Oils and Fats; and I do hereby declare the following to be a full, clear, and exact description of the same.

My invention relates to the treatment vessels or autoclaves, in which the oil or fat to be hydrogenized or hardened is brought into contact with and combines with hydrogen gas by the medium of interaction of a suitable catalyst, the molecular structure of the oils or fats being thus built up or synthesized into saturated compounds such as stearin.

My improved apparatus consists of a vertical cylindrical high pressure metallic vessel heated externally by well known methods such as a steam jacket or furnace flue. Within this vessel I place a vertical central shaft fitted with disks and rotated by ordinary mill gearing exterior to the vessel. The shaft passes upward through a packed gas and oil tight water cooled gland on the base of the autoclave and may be supported on ball bearings. The disks occupy a horizontal position and rotate in a horizontal plane. Extending from the internal walls of the vessel I provide a series of sloping annular shelves which alternate with the disks and overhang same. Blades or beaters are attached to the upper surfaces of the disks.

The present invention is an improvement in, or modification of, the invention forming the subject of my prior British Patent No. 968 A. D. 1915. In the said prior patent a pipe is employed which conveys the oil and catalyst from the bottom of the vessel to the top, this pipe being shown as passing externally to the steam jacket or furnace flue, but this external pipe has been found to cause a tendency to solidification and cooling of the oil, particularly after the apparatus has been standing, which is objectionable.

The object of the present invention is to obviate this defect and to cause a more uniform heating of the oil and in accordance therewith the apparatus embodies a pair of vessels one within the other a space intervening, the interior vessel containing the agitating shelves and beaters, this interior vessel is open at the top and has an opening at the bottom through which the oil is drawn, the oil being raised by a suitable centrifugal or other pump within the space between the inner and outer vessel and around the inner vessel, and overflows over the top of the inner vessel when it reaches a sufficient height, thus becoming subject to the action of the beating or spraying mechanism.

Referring to the drawings in which the figure is a sectional view inside elevation— the apparatus embodies a vertical cylindrical high pressure metallic vessel 1 heated externally by well known methods such as a steam jacket or the furnace flue 2 as shown. Within this vessel 1 is another vessel 3 open at the top and having a central opening 4 at the base, the vessels 1 and 3 thus communicating with each other freely at the top and through the opening 4 at the base.

Passing through the center of these vessels is a shaft 5 fitted with disks or centrifugal sprayers 6 in manner shown in the prior specification, these disks being conveniently square in plan, the shaft and disks being rotated by mill gearing 7 from any suitable source. The shaft 5 passes through a packed gas and oil tight water cooled gland 8 at the base and may, if desired, be supported by ball or other suitable bearings.

Extending from the internal walls of the vessel 3 I provide a series of sloping more or less annular shelves 9 which alternate with the disks and overhang same, those shown being of conical form provided with square central holes corresponding in size and shape to the disks 6. Blades or beaters 10 are attached to the upper surface of the disks. In the construction shown the shelves are mounted upon hoops 11 and each is connected to a second hoop 12 by means of legs or distance pieces 13, the second hoop resting on the upper surface of a subsequent shelf, so that the series may be built up one upon the other without the necessity for riveting through the shell of the vessel; all being in manner shown in the prior specification.

A centrifugal pump 15 is located in the bottom of the vessel 1 and beneath the vessel 3, or any other equivalent pump may be employed, this pump serving to draw the oil from the vessel 3 by means of the opening 4 and to deliver it upwardly through the annular space between the vessels 1 and 3 until it overflows into the interior of the vessel 3 in manner indicated by the arrows. By this means the external pipe is dispensed with, the whole apparatus being contained within the flue or other heating device, and the oil is moved rapidly over the heated surface, and tendency to overheat and decompose, minimized.

Valves are provided for the admission or withdrawal of the oil and catalyst through the pipe 17 and the hydrogen under pressure through the pipe 16, while the upper pipe 17 serves for the communication of a vacuum from suitable pumps.

The construction of the vessel is such that on heating same up by means of the steam jacket or flue and placing therein the oil or fat together with a due proportion of the necessary catalyst and admission of hydrogen gas at a suitable pressure the vertical shaft with its series of disks is rotated at a high speed the pump withdrawing the mixture of oil and catalyst from the base of the vessel and delivering same into the upper part. The said oil and catalyst in an atmosphere of hydrogen gas under pressure flows on to the highest annular tray which in turn delivers it upon the highest rotating disk which dashes it in a horizontal spray upon the walls of the inner vessel, after which the next lower tray of the series catches the material and delivers it upon the next lower rotating disk, which again sprays it, and so on from tray to disk until the lower end of the vessel is reached, after which the material is again raised by the pump and the process repeated until the required saturation is effected.

What I claim then is:—

1. Apparatus for hydrogenating oils and fats comprising an inner vessel open at top and bottom, an outer vessel inclosing said inner vessel, valve controlled pipe connections to the outer vessel for the admission and withdrawal of oil and catalyst, for the admission of hydrogen, and for the communication of vacuum; a pump for circulating the oil and catalyst from the base of the inner vessel to the base of the outer vessel and thence to the top of the inner vessel upwardly through the space between the inner and outer vessels, means within the inner vessel for spraying the oil and catalyst, and means for heating the outer vessel.

2. Apparatus for the hydrogenization of oils and fats comprising an inner vessel open at top and bottom, an outer vessel inclosing said inner vessel, valve controlled pipe connections to the outer vessel for the admission and withdrawal of oil and catalyst, for the admission of hydrogen, and for the communication of vacuum, a pump in the base of the outer vessel but exterior to the inner vessel for circulating the oil and catalyst from the base of the inner vessel to the base of the outer one and thence to the top of the inner vessel upwardly through the space between the inner and outer vessels, means within the inner vessel for spraying the oil and catalyst, and means for heating the outer vessel.

3. Apparatus for the hydrogenization of oils and fats comprising an inner vessel open at top and bottom, an outer vessel inclosing said inner vessel, valve controlled pipe connections to the outer vessel for the admission and withdrawal of oil and catalyst, for the admission of hydrogen, and for the communication of vacuum, a pump in the base of the outer vessel but exterior to the inner vessel for circulating the oil and catalyst from the base of the inner vessel to the base of the outer one and thence to the top of the inner vessel upwardly through the space between the inner and outer vessels, rotary beaters within the inner vessel for spraying the oil and catalyst, means for heating the outer vessel, and a vertical driven shaft upon which are mounted said pump and said rotary beaters.

4. Apparatus for the hydrogenization of oils and fats comprising a vertically disposed cylindrical inner vessel open at top and bottom, a vertically disposed cylindrical outer vessel inclosing said inner vessel, valve controlled pipe connections to the outer vessel for the admission and withdrawal of oil and catalyst, for the admission of hydrogen, and for the communication of vacuum, a centrifugal pump in the base of the outer vessel but exterior to the inner vessel for circulating the oil and catalyst from the base of the inner vessel to the base of the outer one and thence to the top of the inner vessel upwardly through the space between the inner and outer vessels, means within the inner vessel for spraying the oil and catalyst, and means for heating the outer vessel.

5. Apparatus for the hydrogenization of oils and fats comprising a vertically disposed cylindrical inner vessel open at top and bottom, a vertically disposed cylindrical outer vessel inclosing said inner vessel, valve controlled pipe connections to the outer vessel for the admission and withdrawal of oil and catalyst, for the admission of hydrogen, and for the communication of vacuum, a centrifugal pump in the base of the outer vessel but exterior to the inner vessel for circulating the oil and catalyst from the base of the inner vessel to the base of the outer one and thence to the top of the inner vessel upwardly through the space between the inner and outer vessels, rotary beaters within the inner vessel for spraying the oil and catalyst, means for heating the outer vessel, and a vertical driven shaft upon which are mounted said pump and said rotary beaters.

In witness whereof I affix my signature.

HOWARD LANE.